(12) United States Patent
Engleson et al.

(10) Patent No.: US 7,153,531 B2
(45) Date of Patent: *Dec. 26, 2006

(54) FOOD COMPOSITION

(75) Inventors: Jodi Engleson, Minnetonka, MN (US); Katy J. Dishart, Lititz, PA (US); Krista L. Ditzler, Fredericksburg, PA (US); Mark D. Freeman, Lititz, PA (US); Richard A. Schwartz, Lititz, PA (US); John J. Urbanski, Lancaster, PA (US); Robert E. Wainwright, Matthews, NC (US)

(73) Assignee: Cargill, Incorporated, Wayzata, MN (US)

( * ) Notice: Subject to any disclaimer, the term of this patent is extended or adjusted under 35 U.S.C. 154(b) by 173 days.

This patent is subject to a terminal disclaimer.

(21) Appl. No.: 10/328,847

(22) Filed: Dec. 23, 2002

(65) Prior Publication Data

US 2004/0121045 A1 Jun. 24, 2004

Related U.S. Application Data (63) Continuation-in-part of application No. 09/888,343, filed on Jun. 22, 2001, now Pat. No. 6,605,309.

(51) Int. Cl.
*A23B 9/14* (2006.01)

(52) U.S. Cl. .................... 426/89; 426/96; 426/98; 426/560; 426/653

(58) Field of Classification Search .............. 426/96, 426/98, 99, 94, 560, 658, 660, 653
See application file for complete search history.

(56) References Cited

U.S. PATENT DOCUMENTS

| | | | |
|---|---|---|---|
| 2,952,544 A | 9/1960 | Durst et al. | |
| 3,431,112 A | 3/1969 | Durst | |
| 3,719,497 A | 3/1973 | Galle et al. | |
| 3,872,229 A | 3/1975 | Durst et al. | |
| 3,872,230 A | 3/1975 | Sinner et al. | |
| 3,947,599 A | 3/1976 | Mitchell, Jr. | |
| 4,112,125 A * | 9/1978 | Chesnut et al. | 426/250 |
| 4,119,740 A | 10/1978 | Crespo | |
| 4,217,369 A | 8/1980 | Durst | |
| 4,235,939 A | 11/1980 | Kimberly, Sr. | |
| 4,364,967 A | 12/1982 | Black | |
| 5,403,601 A | 4/1995 | Komai et al. | |
| 5,439,697 A | 8/1995 | Gonzalez-Sanz | |
| 5,676,993 A | 10/1997 | Watterson et al. | |
| 5,762,990 A | 6/1998 | Wada et al. | |
| 5,942,275 A | 8/1999 | Wong et al. | |
| 6,010,737 A | 1/2000 | Meade | |
| 6,110,511 A * | 8/2000 | Rollins et al. | 426/94 |
| 6,238,926 B1 | 5/2001 | Liu et al. | |
| 6,447,833 B1 | 9/2002 | Widlak | |
| 6,605,309 B1 | 8/2003 | Freeman et al. | |
| 6,740,350 B1 * | 5/2004 | Pfeiffer | 426/572 |
| 6,773,744 B1 * | 8/2004 | Ward et al. | 426/659 |
| 2002/0037355 A1 | 3/2002 | Wong et al. | |
| 2002/0037356 A1 | 3/2002 | Wong et al. | |
| 2002/0071898 A1 | 6/2002 | Trout et al. | |

FOREIGN PATENT DOCUMENTS

| | | |
|---|---|---|
| CA | 1016398 | 8/1977 |
| JP | 5-276903 | 10/1993 |

OTHER PUBLICATIONS

"Nut-Nots™ Macadamia Nut Extenders help cookie makers save dough," Wilbur Sweet Collaboration, Aug. 20, 2001, 1 page.
Akzo Nobel, "Creating the right chemistry," available at http://www.geocities.com/CapeCanaveral/4610/fatty-acid.htm, available at least by Jun. 8, 2001, 1 page.
Technical Information, Flavors of North America, Inc., Allergen Review, available at least by Jun. 7, 2001, 1 page.
Website page regarding Processing Palm Kernel Oil for CBSs, available to http://sci.mond.org/lps, available at least by Jun. 20, 2001, 1 page.
Pantzaris et al., "Palm Kernel Oil, " Palm Oil Research Institute of Malaysia (PORIM Europe), available at least by Jun. 20, 2001, 3 pages.
Noller, Chemistry of Organic Compounds, W.B. Saunders Company, 1957, page 181.
Loders Croklaan, Data Sheet regarding COTE HI STEARINE, High Performance Structuring System for Oil Separation Inhibition, available at least by Jun. 8, 2001, 1 page.
Aarhus, Inc., Product Data Sheet regarding CEBES® 21-10, available at least by Jun. 8, 2001 (dated Apr. 1998), 1 page.
Aarhus, Inc., Nutritional Data, available at least by Jun. 12, 2001, 5 pages.
Aarhus, Inc., Cebes® Product Line, available at http://www.aarhususa.com/products.htm, ®2000 Aarhus Inc., 1 page.

* cited by examiner

*Primary Examiner*—Lien Tran
(74) *Attorney, Agent, or Firm*—Foley & Lardner, LLP; Edward L. Levine (57) ABSTRACT

Food components including a triacylglycerol component and a bulking agent are provided. The triacylglycerol component typically has a melting point of about 100 to 120° F. and constitutes about 20 to 35 wt. % of the food components. The food component can be formed by heating a composition which includes the triacylglycerol component and bulking agent under conditions sufficient to form an outer layer having certain desired physical characteristics. Food products incorporating the food components are also provided.

36 Claims, 6 Drawing Sheets

FOOD COMPOSITION

CROSS-REFERENCE TO RELATED APPLICATIONS

This application is a Continuation-In-Part of U.S. application Ser. No. 09/888,343, filed Jun. 22, 2001, and issued as U.S. Pat. No. 6,605,309, on Aug. 12, 2003.

BACKGROUND

Nuts have been used as a food source for thousands of years. During this time, the popularity of nuts as a food source can be attributed, at least in part, to their pleasing taste and nutritional value. Nuts are also recognized as being a good source of protein.

Nuts are currently used in many different food products to add flavor and variety. Products such as ice cream, chocolates, cookies, etc., are more appealing when eaten in combination with nuts such as peanuts, macadamia nuts, walnuts, pistachios, cashews, almonds, brazil nuts and the like. Accordingly, there is strong demand for these types of nuts.

Unfortunately, nuts have many disadvantages. Nuts are expensive, and the cost of a food product incorporating nuts increases accordingly. Nuts may contain aflatoxins, a toxic, naturally occurring mycotoxin produced by mold that may grow on the nuts. Many of the aflatoxins are thought to be carcinogenic to humans. In addition, some nuts contain potential allergens that when ingested can cause a severe reaction. Accordingly, it would be advantageous to develop a simulated nut product that minimizes or eliminates many of these disadvantages while preserving the advantages of nuts.

Over the years, attempts have been made to produce a nut substitute for use in food products. However, many of these attempts were unsatisfactory because the nut substitute did not possess the necessary texture, bite, taste, or look of natural nuts. Nuts are often incorporated into products that must be cooked or baked such as cookies, brownies, muffins, pies, butterscotch, breads, cakes, etc. Many of the nut substitutes, however, cannot withstand the high temperatures involved in cooking or baking without losing some of their nut-like characteristics.

SUMMARY

The present application relates to food components and related products and methods for making food compositions. The food components may be flavored to provide to nut-like food compositions. The present toasted food components include a triacylglycerol component and a bulking agent. The bulking agent commonly includes an agent capable of forming a continuous crystalline network. The triacylglycerol component normally constitutes about 20 to 35 wt. % (all percents are in weight unless specified otherwise) of the resulting food component. Confectionery fats, which have a melting point of about 100 to 120° F., can be very useful in forming the present food components since such fats can have a mouth-feel similar to that of the fat component naturally present in nuts. The confectionery fat may be a lauric fat, a non-lauric fat or a combination thereof. One example of a suitable triacylglycerol component can be formed by combining a lauric triacylglycerol with a saturated 16/18 triacylglycerol. Alternatively, where a lauric triacylglycerol ("lauric fat") is desired, any suitable method can be used to provide a triacylglycerol component having a fatty acid composition which includes at least about 30 wt. % lauric acid. Particularly suitable triacylglycerol components can have a fatty acid composition which includes at least about 30 wt. % lauric acid and at least about 10 wt. % palmitic acid and/or stearic acid.

The bulking agent used in the present food components can include any nutritive or non-nutritive agent added to increase the volume and bulk of the composition. In a typical embodiment of the present food component, the bulking agent includes a component capable of forming a continuous crystalline network. The food component is commonly in particulate form, e.g., in the form of drops and/or bits, where the particulates have an outer layer which includes a continuous crystalline network. The formation of the continuous crystalline network in the outer layer can provide particulate food components that have a nut-like consistency, e.g., as characterized by their sensory hardness value. Examples of particularly suitable bulking agents include sugars, such as dextrose, which are capable of forming a continuous crystalline network. As described herein, food components having a continuous crystalline network can be formed by heating a food blend component under appropriate conditions to provide a food material with an outer layer having the desired sensory hardness value and/or other physical characteristic. The food materials produced by heating a composition which includes the triacylglycerol component and bulking agent are referred to herein as "toasted food components" and in some instances are referred to as "food components" having certain specified physical characteristics.

Food products which include the toasted food components are also provided herein. RTE cereals, snack bars, food toppings, ice cream, candies, snack mixes, and baked products are examples of food products which can include the present toasted food components. Suitable examples of such baked products include muffins, cakes, cookies, brownies, fudge, pies, bar desserts, and soft pretzels. In many applications, the food products include a form of the toasted food components which has been processed (typically by heating) to have a sensory hardness value of at least about 6 and a water activity of no more than about 0.4. In some instances, such toasted food components may have a sensory hardness value of 9 or higher, e.g., toasted food components with a sensory hardness value of at least about 10 to 12 and a water activity of about 0.2 to 0.3. This may be achieved by heating an unbaked ("raw") form of a food composition ("food blend component") which includes a confectionery fat and the bulking agent for a sufficient time and temperature to harden an outer layer of the food blend component to the desired sensory hardness value. The endpoint of the toasting process can also be evaluated and characterized by other physical parameters, such as the monolayer value, the diffusion coefficient of the outer layer of the toasted food component and/or by examining the early the sensory hardness value and/or stiffness and/or toughness of a particulate form of the toasted food component. The resulting particles of the toasted food component can be incorporated into and/or distributed on food products.

The present food components may include at least about 50 wt. % of a bulking agent which includes a saccharide component, and about 20 to 35 wt. % of a confectionery fat. The saccharide component typically includes a sugar, such as dextrose. The bulking agent may include other components as well, e.g., cocoa powder and/or non-fat milk solids. The confectionery fat typically has a melting point of about 100 to 120° F. and can include a lauric fat and/or a non-lauric fat. One example of a suitable lauric fat has a melting point of about 100 to 110° F. and a fatty acid composition which includes at least about 30 wt. % lauric acid and at least about 10 wt. % palmitic acid and/or stearic acid.

In one embodiment, the present food component includes a bulking agent and a triacylglycerol component which includes at least about 75 wt. % of a lauric triacylglycerol and about 1 to 10 wt. % of a saturated 16/18 triacylglycerol. A food blend of this type may be toasted to form a food component which may also include other ingredients such as flavoring(s), emulsifier, and/or colorant(s).

The toasted food component typically includes an outer layer which has a monolayer value at 25° C. of at least about 1.3 wt. %. Other embodiments of the toasted food component may be in a particulate form which has a sensory hardness value of at least about 6 and a stiffness of at least about 50 N*sec. Yet other embodiments of the toasted food component may be in particulate form and have a stiffness of at least about 100 N/sec and, more preferably at least about 125 N/sec, and a water activity of no more than about 0.4. In certain embodiments, the toasted food component may have a water activity of no more than about 0.4 and include an outer layer which exhibits an effective diffusion coefficient of no more than about $1.1 \times 10^{-7}$ m$^2$/min at 70° C. In other embodiments the particulate form may have a water activity of no more than about 0.4 and include an outer layer characterized by an effective diffusion coefficient of no more than about $8 \times 10^{-8}$ m$^2$/min at 50° C.

In another embodiment, the present food component includes a bulking agent combined with a triacylglycerol component which has a fatty acid composition including at least about 30 wt. % lauric acid and at least about 10 wt. % total of palmitic and stearic acid. This embodiment of the food component may also include other ingredients such as flavoring(s), salt, emulsifier and/or colorant(s). The bulking agent typically includes a saccharide component and may also include nonfat milk solids and/or cocoa powder.

The present toasted food components can be produced using a process that includes (a) providing a food composition, typically in particulate form, which includes a bulking agent, and about 20 to 35 wt. % of a confectionery fat having a melting point of about 100 to 120° F.; and (b) heating the food composition for a sufficient amount of time and to a sufficient temperature to provide particulates which include an outer layer including a continuous crystalline network. The oven temperature and time of exposure to heat are typically sufficient to form such a structure in an outer layer of the toasted food component.

In one embodiment, the present method includes providing a food composition in particulate form which includes at least about 50 wt. % of a bulking agent, and about 20 to 35 wt. % triacylglycerol component (e.g. a confectionery fat) having a melting point of about 100 to 120° F.; and heating the food composition particulates to about 325 to 410° F. for about 5 to 15 minutes to form toasted food components.

In another embodiment, the present toasted food components can be produced by a method that includes providing a food composition, commonly in particulate form, which includes a bulking agent, such as a saccharide component, and about 24 to 33 wt. % of a triacylglycerol component having a melting point of about 100 to 120° F.; and heating the food composition particulates to form food material with a sensory hardness value of at least about 6 and a water activity of no more than about 0.4 and/or include an outer layer which has a monolayer value at 25° C. of at least about 1.3 wt. %. The toasted food component typically has an outer layer which includes a continuous crystalline network, e.g., a continuous crystalline network of a sugar material which includes dextrose. The heating operation is preferably carried out such that the chemical components of the toasted food component are essentially unchanged (in terms of the amounts of its chemical components such as sugars, fats, protein and the like) by the heating process as evidenced by comparison to the composition of the corresponding food blend component.

BRIEF DESCRIPTION OF THE FIGURES

FIG. 4 shows a graph of the Fourier transform infrared spectroscopy of (A) a toasted food component prepared according to Example 1b and (B) a food blend component prepared according to Example 1a.

DETAILED DESCRIPTION

Exemplary toasted food components and food products containing the food components, and methods for producing the same are described herein. A desirable advantage of the present food components is that they may be safer for human consumption than food products containing nuts. This can be accomplished using the present food components by incorporating little, if any, materials from nuts in the food components and/or in food products which include the food components. The resulting food composition would thus commonly be free of allergens that can cause allergic reactions as well as potentially carcinogenic aflatoxins. Many people that were previously unable or unwilling to eat products containing nuts could eat the present food components and food products. In addition, the risk of a potentially deadly allergic reaction could be greatly reduced.

The present compositions and method allow the production of toasted food components that have essentially the same chemical composition throughout (e.g., in terms of the amounts of protein, fat, sugars and the like) but include inner and outer layers with significantly different physical properties. As described herein, the present food blend components can be heated to produce toasted food components that include an outer layer having a monolayer value of at 25° C. of at least about 1.3 wt. % and an inner layer having a monolayer value of at 25° C. of no more than about 1.0 wt. %. For instance, the examples described herein demonstrate that the present toasted food component, while having an essentially uniform chemical composition throughout, can include an outer layer with a monolayer value of at 25° C. of about 1.5 to 2.5 wt. % and an inner layer with a monolayer value of at 25° C. of no more than about 0.9 wt. %. As noted herein, the chemical components in the outer layer of the toasted food component can be essentially unchanged by the heating process as evidenced by comparison to the composition of the corresponding untoasted food blend component. The resulting toasted food component can exhibit a sensory hardness value similar to that observed for various nuts, e.g., in the range of about 6 to 12 while having a water activity which is no more than about 0.4. The outer layer typically includes a continuous crystalline network, e.g., a continuous crystalline network which includes a sugar such as dextrose.

The differences in physical characteristics between the inner and outer layers can also be characterized in terms of other physical parameters, e.g., in terms of the effective diffusion coefficient. For example, the present toasted food components can include an inner layer with a water activity of no more than about 0.4 and an effective diffusion coefficient ($D_{eff}$) at 50° C. of at least about $1.0 \times 10^{-7}$.and an outer layer with a water activity of no more than about 0.4 and an effective diffusion coefficient ($D_{eff}$) at 50° C. of no more than about $8 \times 10^{-8}$. Other embodiments of the present toasted food components can include an inner layer with a water activity of no more than about 0.4 and an effective diffusion coefficient ($D_{eff}$) at 70° C. of at least about $1.2 \times 10^{-7}$.and an outer layer with a water activity of no more than about 0.4 and an effective diffusion coefficient ($D_{eff}$) at 50° C. of no more than about $1.0 \times 10^{-7}$. The toasted food component may be in a sheet-like form with the inner layer sandwiched between two outer layers. More commonly, the toasted food component is in particulate form, e.g., in the form of drops or chips, with the inner layer substantially surrounded by the outer layer.

The present food components include a bulking agent, which commonly includes a saccharide component, and a triacylglycerol component, which may include a lauric triacylglycerol. The triacylglycerol component generally has a melting point of about 100 to 120° F., suitably about 100 to 110° F., and more desirably of about 102 to 107° F. (unless otherwise specifically noted herein, all melting point determinations are as determined by the mettler drop point method). The amounts and nature of the bulking agent, triacylglycerol component and any other additives are commonly chosen so that after being blended together the resulting food component has the desired a melting point.

As referred to herein, a "lauric fat" or "lauric triacylglycerol" is a triacylglycerol having a fatty acid composition which includes at least about 30 wt. % lauric acid. A "saturated 16/18 triacylglycerol," as used herein, is a triacylglycerol having a fatty acid composition including at least about 95 wt. % palmitic acid and/or stearic acid. Saturated 16/18 triacylglycerols typically have an Iodine Value of no more than about 5. Iodine Value is one measure for characterizing the average number of double bonds present in a triacylglycerol stock which includes triacylglycerol molecules with unsaturated fatty acid residues. The Iodine Value of a triacylglycerol or mixture of triacylglycerols is determined by the Wijs method (A.O.C.S. Cd 1-25).

The present toasted food component typically includes about 20 to 35 wt. %, more desirably about 24 to 31 wt. % of the triacylglycerol component, and, suitably, about 27 to 30 wt. % percent of the triacylglycerol component. The triacylglycerol component can be formed by combining a lauric triacylglycerol with a saturated 16/18 triacylglycerol. Commonly known oils that would be considered lauric triacylglycerols include palm kernel oil, coconut oil, laurate canola oil (a genetically engineered canola oil having a fatty acid composition which includes at least about 35 wt. % lauric acid) and babassu oil. Palm kernel oil and fractionated and/or hydrogenated forms of palm kernel oil are particularly suitable lauric triacylglycerols for use in producing the present food components. However, any oil or other composition, whether naturally occurring or not, would qualify as a lauric triacylglycerol if it is edible and its fatty acid composition includes at least about 35 wt. % lauric acid. Usually, the lauric triacylglycerol makes up at least about 75 wt. % of the triacylglycerol component, and, preferably, the lauric triacylglycerol makes up at least about 85 wt. % of the triacylglycerol component. In some embodiments of the toasted food composition, the lauric triacylglycerol may constitute about 90 wt. % or more of the triacylglycerol component.

The triacylglycerol component may also include a saturated 16/18 triacylglycerol. Suitable examples of saturated 16/18 triacylglycerols include highly hydrogenated forms of palm oil, cottonseed oil, soybean oil, corn oil, canola oil and the like. However, any other oil, whether naturally occurring or not, would qualify as a saturated 16/18 triacylglycerol if their fatty acid composition includes at least about 95 wt. % total palmitic acid and stearic acid. Typically, the Iodine Value of the saturated 16/18 triacylglycerol is very low, e.g., no more than 5 and more commonly no more than 2. Usually, the saturated 16/18 triacylglycerol makes up about 1 to 8 wt. % of the triacylglycerol component, and, preferably, about 2 to 6 wt. %.

The triacylglycerol component may also include other triacylglycerols not previously mentioned. Suitable examples of other triacylglycerols that may be included in the triacylglycerol component are triacylglycerols from milk, butter, lard, tallow, lard oil, whale oil, fish oil, cottonseed oil, and/or sunflower oil. Triacylglycerols from animals, such as milk, butter, lard, and/or tallow, can be particularly suitable for use in producing the nut-like food composition. However, any other suitable triacylglycerol may be used. Very often, the triacylglycerol component includes no more than about 25 wt. %, and, more desirably, no more than about 15 wt. % of triacylglycerols other than the lauric triacylglycerol and saturated 16/18 triacylglycerol. In some embodiments, the triacylglycerol component may be formed entirely from a mixture of the lauric triacylglycerol and the saturated 16/18 triacylglycerol.

The triacylglycerol component of the present food blend components may be characterized in terms of its fatty acid composition. Where it is desired to employ a lauric based fat, the fatty acid composition of the triacylglycerol component commonly includes at least about 30 wt. % lauric acid and at least about 10 wt. % total of palmitic acid and stearic acid. The fatty acid composition may, however, include higher amounts of lauric acid such as: at least about 35 wt. %, or, more desirably, at least about 40 wt. % or at least about 50 wt. % lauric acid. The fatty acid composition typically includes about 10 to 22 wt. %, more desirably, about 10 to 20 wt. % palmitic and/or stearic acid and, suitably, about 12 to 18 wt. % total palmitic and stearic acid. In addition, the fatty acid composition may also include about 3 to 18 wt. %, more desirably about 5 to 12 wt. % and, preferably, about 5 to 8 wt. % oleic acid. The fatty acid composition may also include myristic acid, e.g., at least about 15 wt. % myristic acid. Examples of suitable triacylglycerol components can have a fatty acid composition which includes at least about 30 wt. % lauric acid; about 5 to 12 wt. % oleic acid; and about 10 to 20 wt. % palmitic acid and/or stearic acid. Other examples of suitable triacylglycerol components can have a fatty acid composition which includes at least about 40 wt. % lauric acid; about 5 to 8 wt. % oleic acid; at least about 15 wt. % myristic acid; and about 12 to 18 wt. % total of palmitic acid and stearic acid.

The food blends described herein can be used to provide a nut-like food compositions that have a consistency and flavor very close to that of a corresponding natural nut. The food blends include a bulking agent, which typically makes up a large portion of the composition, e.g., 50 wt. % or more of the total weight of the composition. Examples of suitable bulking agents include carbohydrates, protein-based materials, minerals and related mixtures. Whey powder, which is a mixture of materials including lactose, protein, lactic acid and ash, and non-fat milk solids, which are a mixture including casein and other proteins (e.g., serum proteins), lactose, minerals and vitamins, are examples of complex mixtures that can be used as bulking agents. Where the food blend component includes whole milk solids, the fat portion of the whole milk solids is considered to be part of the triacylglycerol component and the remainder ("non-fat milk solids") is considered to be part of the bulking agent. The bulking agent may also include table salt (sodium chloride) in an amount sufficient to achieve a desired flavor. The inclusion of sodium chloride in the feed blend used to produce a toasted material with desirable characteristics, e.g., a material with a relatively low water activity which includes sodium chloride as a means to aid in formation of a continuous outer layer.

The bulking agent typically employed in the present food components typically includes a saccharide component. The saccharide component can be a simple sugar (a monosaccharide), a disaccharide, a more complex carbohydrate or a mixture thereof. One example of such a suitable mixture, which includes dextrose and more complex saccharides, is corn syrup. Other specific examples of suitable saccharides include sucrose, lactose, polydextrose, maltodextrose, trehalose, and inulin. To provide a desirable sweet flavor, the present food composition often includes sucrose, dextrose and/or lactose. The inclusion of an appropriate amount of dextrose can also influence the hardness characteristics achievable by the food composition on heating (e.g., via baking as part of a food product). To achieve food blend components that can be converted by heating into a material with a nut-like hardness and texture, it may be advantageous to include about 2 to 9 wt. % dextrose (based on the total weight of the composition) in the food component. Measured in a different manner, where the present food blend components includes at least about 50 wt. % bulking agent, it may be particularly advantageous to include about 3 to 12 wt. % dextrose (based on the total weight of the bulking agent) in a nut-like food composition. The present food components commonly include at least about 50 wt. % of a saccharide component which includes about 3 to 12 wt. % dextrose (based on the total weight of the saccharide component).

It can be advantageous to include non-fat milk solids as part of the bulking agent. If the present food blend component is heated sufficiently (e.g., to a temperature of about 300° F. or higher), non-fat milk solids present in the composition can undergo a browning reaction and result in a change in coloration and appearance of the food blend component. If a relatively large amount of non-fat milk solids is included in a food blend component, it can contribute a noticeable milk flavor to the composition. Depending on the type of food product, this may or may not be a desirable attribute. When non-fat milk solids are included in the present toasted food component, the amount is commonly chosen to be sufficient to lead to a browning of the composition while not contributing a noticeable milk flavor to the composition. It has been found that this can often be achieved in the present food compositions by including about 5 to 15 wt. % non-fat milk solids.

The toasted food components may also include an emulsifier. The inclusion of the emulsifier will often lower the viscosity of the food blend used to form the toasted food components in comparison to a corresponding composition having a similar amount of triacylglycerol component but lacking the emulsifier. Examples of suitable emulsifiers include lecithin, monoglycerides, digicerides, polyglycerol polyricinoleate ("PGPR") and mixtures thereof. When lecithin is employed as an emulsifier, it is often present as about 0.1 to 0.5 wt. % of the total weight of the food blend (e.g., with food compositions that include about 20 to 35 wt. % of the triacylglycerol component).

The toasted food components can also include other ingredients, such as flavorings and colorants. The flavorings may be natural flavoring and/or artificial flavorings. The toasted food components may include a nut flavoring related to the nut the particular composition may be attempting to mimic. Examples of nut flavorings include macadamia nut, walnut, pecan, almond, peanut, and pistachio flavorings. It is often desirable that the nut flavoring be certified as being free of nut allergens. This may also be true for the other ingredients used to produce the nut-like food composition, since a potential advantage of the present toasted food components is that, in contrast to nuts, it can be free of nut allergens that can cause allergic reactions. The toasted food components can also include cocoa powder. In addition to acting as a flavoring, cocoa powder can impart color to the composition.

Definition of Parameters

The sensory hardness value refers to an intensity scale value for solid oral texture analysis. As referred to herein, the sensory hardness value is determined using the following procedure. Initially, a panel of people is trained in detecting the sensory hardness value of different food items. Table 1 shows the foods used to train the panel. The panel is instructed to place the food item between their molars and bite down evenly, evaluating the force required to compress the food. In this manner, the sensory hardness of a sample can be compared with that of the scale values. Meilgaard, Civille, and Carr, 1999, Sensory Evaluation Techniques, 3$^{rd}$ ed. pg 200, the disclosure of which is herein incorporated by reference.

TABLE 1

Standard Hardness Scale

| Scale Value | Reference | Brand/Type/Manufacturer | Sample Size |
|---|---|---|---|
| 1.0 | Cream Cheese | Kraft/Philadelphia Light | ½ in. cube |
| 2.5 | Egg White | Hard Cooked | ½ in. cube |
| 4.5 | Cheese | Yellow American Pasteurized Process/Land O'Lakes | ½ in. cube |
| 6.0 | Olives | Goya Foods/giant size, stuffed | 1 olive, pimento removed |
| 7.0 | Frankfurter | Large, cooked 5 min/Hebrew National | ½ in. cube |
| 9.5 | Peanuts | Cocktail type in vacuum tin/Planters | 1 nut, whole |
| 11.0 | Carrots | Uncooked, fresh, unpeeled | ½ in. cube |
| 13.0 | Almonds | Shelled/Planters | 1 nut |
| 14.5 | Hard Candy | Lifesavers | 3 pieces, one color |

Water activity ($a_w$) is a measurement of how tightly water is bound, structurally or chemically, in a material. More specifically, water activity is defined as the ratio of the water vapor pressure over a sample (P) to the water vapor pressure over pure water ($P_0$). The water activity is determined using a water activity meter.

Other mechanical characteristics of a material may be analyzed using a TAXT2i texture analyzer (available from Texture Technologies, New York). The texture analyzer compresses a material at a constant rate (0.5 mm/s, 3 mm total distance), and measures instantaneous load as a function of time. Mechanical characteristics can be approximated from the load vs. time curve assuming constant sample geometry. Materials analyzed herein had a base of about 10.5 mm and a height of about 7 mm.

One mechanical characteristic that can be determined using the texture analyzer is a material's resistance to deformation, otherwise referred to as stiffness (S). As referred to herein, the stiffness value is determined using the following procedure. In an attempt to estimate the initial slope of the load-time curves, the maximum of the first derivative of instantaneous load (F) with respect to time (t) is derived from the load-time curves and can be referred to as the material's stiffness. S is approximated using the secant line of the load-time points adjacent to point i:

$$S = \max\{S_i\} \approx \max\left\{\frac{F_{i+1} - F_{i-1}}{2\Delta t}\right\}$$

where $S_i$ is the first derivative at i and $\Delta t$ is the difference $t_i - t_{i-1}$.

Another mechanical characteristic that can be determined using the texture analyzer is a material's toughness (T). To approximate the area under the load-time curves generated using the texture analyzer, the definite integral of instantaneous force from time 0 to 6 s is calculated for use as a toughness indicator (T). Loosely speaking, toughness is a measure of the ability of a material to absorb energy during compression. As employed herein, "toughness" (T) refers to the midpoint ($\bar{t}_i$) of $[t_{i-1}, t_i]$ and the Riemann sum:

$$T = \int_0^6 F(t)dt \approx \sum_{i=1}^n F(\bar{t}_i)\Delta t$$

where n is the number of midpoints from time 0 to 6 s.

The moisture sorption isotherm depicts the relationship between equilibrium moisture content and water activity ($a_w$) at constant temperature. Simple mathematical models and the moisture sorption isotherm can be used to predict both the equilibrium $a_w$ of foods and the time to reach equilibrium.

Autosorption devices for continuous monitoring of weight change over time are known as controlled atmosphere microbalances (CAM). These systems allow the moisture sorption isotherm to be generated quickly using milligram sample sizes. The CAM IGASorp Moisture Sorption Analyzer is a microbalance enclosed by glass through which humidified air passes. Water activity and change in mass of the sample at constant temperature are monitored continuously. Upon reaching equilibrium, the system proceeds automatically to the next water activity.

The isotherm is modeled using the Guggenheim-Anderson-de Boer (GAB) equation as explained in Bell, L. N., and Labuza, T. P. 2000. Moisture Sorption. Pages 1–67. AACC: St. Paul, the disclosure of which is expressly incorporated herein by reference. This equation determines the monolayer value ($m_o$), the moisture content at which each polar and ionic group has an attached water molecule—forming the start of a liquid-like phase. Above the $m_o$, water can behave like a solvent and in turn increase rates of quality loss. Sorption kinetics can also obtained from the CAM data as a function of $a_w$. Assuming that the diffusion of water through a sample follows Fick's law:

$$\ln\left(\frac{m_e - m_i}{m_e - m}\right) = \frac{\pi^2 D_{eff} \theta}{4L_o} + \ln\left(\frac{\pi^2}{8}\right)$$

where $m_e$ is the final equilibrium moisture, $m_i$ is the initial, m is the moisture at time $\theta$, $D_{eff}$ is the effective diffusion coefficient, and $L_o$ is the half-thickness.

The effect of temperature on the moisture sorption isotherm, and in turn on shelf life, is accounted for with the Clausius-Clapeyron equation:

$$\ln\left(\frac{a_2}{a_1}\right) = \frac{Q_s}{R}\left(\frac{1}{T_1} - \frac{1}{T_2}\right)$$

where $a_1$ is the water activity at temperature $T_1$, $a_2$ is the water activity at $T_2$, $Q_s$ is the heat of sorption, and R is the gas constant. $Q_s$ is the excess binding energy for removal of water. Using moisture sorption isotherms at varying temperature, a plot of $\ln(a_w)$ versus 1/T at constant moisture content gives a line with slope equal to ($Q_s$/R). As moisture content increases, ($Q_s$/R) decreases to zero. Given $Q_s$, the $a_w$ at any temperature can be calculated for the same moisture content used to derive $Q_s$.

Additional Illustrative Embodiments

A number of illustrative embodiments of the present nut-like food compositions are described below. The embodiments described are intended to provide illustrative examples of the food compositions and are not intended to limit the scope of the invention.

The present food components may include at least about 50 wt. % saccharide component, which includes a sugar such as dextrose, and about 24 to 33 wt. % of a confectionery fat. The confectionery fat can include a lauric fat and/or a non-lauric fat. One example of a suitable lauric fat has melting point of about 100 to 120° F. and a fatty acid composition which includes at least about 30 wt. % lauric acid and at least about 10 wt. % palmitic acid and/or stearic acid. The food component commonly includes a bulking agent which includes an component capable of forming a continuous crystalline network. The bulking agent may include other components as well, e.g., cocoa powder and/or non-fat milk solids.

In another embodiment, the present food component includes a bulking agent, which includes a component capable of forming a continuous crystalline network; and about 24 to 33 wt. % of a triacylglycerol component having a melting point of about 100 to 120° F. The food component may be in a particulate form which has a sensory hardness value of at least about 6 and a water activity of no more than about 0.4. Typically, the food component includes at least about 50 wt. % of a saccharide bulking agent, which suitably may include dextrose. In some embodiments the food component includes at least about 50 wt. % of the bulking agent, which includes about 1 to 10 wt. % dextrose based on a total weight of the food component; and the triacylglycerol component has a melting point of about 100 to 110° F.; and includes at least about 80 wt. % of a lauric triacylglycerol and about 1 to 8 wt. % of a saturated 16/18 triacylglycerol.

The food component can include a bulking agent, which typically includes a agent capable of forming a continuous crystalline network; and about 24 to 33 wt. % of a triacylglycerol component having a melting point of about 100 to 120° F. more preferably, about 100 to 110° F. The food component may include an outer layer having a monolayer value at 25° C. of at least about 1.3 wt. %. Commonly, the toasted food component is in particulate form, e.g., in the form of drops or chips, with an inner layer having a lower monolayer value substantially surrounded by the outer layer.

In another embodiment, the food component can include a bulking agent, which includes a component capable of forming a continuous crystalline network. The food component may be in a particulate form which includes an outer layer having an effective diffusion coefficient of no more than about $8 \times 10^{-8}$ m$^2$/min at 50° C. and a water activity of no more than about 0.4. The bulking agent may include dextrose. In yet another embodiment, the outer layer may have a water activity of no more than about 0.4 and include an outer layer which exhibits an effective diffusion coefficient of no more than about $1 \times 10^{-7}$ m$^2$/min at 70° C.

In another embodiment, the present method includes providing a food composition in particulate form which includes at least about 50 wt. % of a bulking agent, and about 20 to 35 wt. % of a triacylglycerol component (e.g. a confectionery fat). The triacylglycerol component may have a melting point of about 100 to 120° F. and a fatty acid composition including at least about 30 wt. % lauric acid and about 10 to 20 wt. % palmitic acid and/or stearic acid. The particulates (e.g., chips or drops) of the food composition are then heated in an oven at about 325 to 410° F. for about 5 to 15 minutes to form toasted food components.

The particulate food components which can be formed by the present method generally have a somewhat harder outer layer. The harder outer layer is typically not so hard as to have sensory hardness value similar to that of hard candy. Rather the sensory hardness value of the particulate food component is typically similar to the in the range observed for many nut meats, e.g., a sensory hardness value of about 6 to 12.

The present food components can be in particulate form and be characterized by a sensory hardness value of at least about 6 and a toughness of at least about 150 N*sec. Typically, the food component includes a bulking agent, which includes dextrose; and about 24 to 33 wt. % of a triacylglycerol component having a melting point of about 100 to 120° F.

In another embodiment, the present food component may be in particulate form and have a stiffness of at least about 100 N/sec and a water activity of no more than about 0.4.

In yet another embodiment, the food component may be in a particulate form which has a sensory hardness value of at least about 6 and a stiffness of at least about 50 N*sec.

In many of the embodiments described herein, the food component can include at least about 50 wt. % of a saccharide component, which includes dextrose; and about 24 to 33 wt. % of a triacylglycerol component having a melting point of about 100 to 120° F. (and more commonly about 100 to 110° F.). One example of a suitable composition for making the present particulates includes a bulking agent and a triacylglycerol component having a fatty acid composition which includes about 5 to 12 wt. % oleic acid; at least about 30 wt. % lauric acid; and about 10 to 20 wt. % total of palmitic acid and stearic acid. Desirably, the fatty acid composition often includes at least about 40 wt. % lauric acid. The triacylglycerol component may have a melting point of about 102 to 107° F.

Very often, the present food component may be formed from a blend of ingredients that includes a bulking agent, which includes about 1 to 10 wt. % (on a total composition basis) dextrose; and a confectionery fat. The confectionery fat may include a triacylglycerol component which has a fatty acid composition including at least about 40 wt. % lauric acid; about 5 to 12 wt. % oleic acid; and about 10 to 20 wt. % total of palmitic acid and stearic acid. The fatty acid composition may also include about at least about 15 wt. % myristic acid.

The following examples are presented to illustrate the present invention and to assist one of ordinary skill in making and using the same. The examples are not intended in any way to otherwise limit the scope of the invention.

EXAMPLE 1

(a) Preparation of a Food Blend Component.

A food blend component was formed using the following procedure. Initially, an oil blend was formed by melting hydrogenated palm oil and mixing it with about 27% of the total fractionated palm kernel oil used in the final food blend component. The amount of fractionated palm kernel oil as a percent of the final food blend component is shown in Table 2. The composition of the resulting oil blend was approximately 14% hydrogenated palm oil and 86% fractionated palm kernel oil. The hydrogenated palm oil is available under the tradename Cote Hi™ stearine from Loders Croklaan, Channahon, Ill. Cote Hi™ stearine has a maximum iodine value of 5.0 and a capillary melting point of 136–144° F. The fractionated palm kernel oil is available under the tradename Cebes® 21–10 from Aarhus, Inc., Port Newark, N.J. Table 3 shows some of the properties and fatty acid composition of Cebes® 21–10 oil. The food blend component contained 28.53 wt. % fat. The triacylglycerol component of the food blend component had a melting point of 105° F.

TABLE 2

Total Composition of the Food Blend Component of Example 1a

| Ingredients | % Fat of Each Ingredient | % of Total Ingredients | % Fat of Total Fat |
|---|---|---|---|
| Sugar | 0 | 50.25 | — |
| Fractionated palm kernel oil | 100 | 27.14 | 95.1 |
| Hydrogenated palm oil | 100 | 1.14 | 4.0 |
| Nonfat dry milk solids | 0 | 12.58 | — |
| Dextrose | 0 | 3.70 | — |
| Lecithin | 100 | 0.23 | 0.8 |
| Nut flavoring | 0 | 0.038 | — |
| Salt | 0 | 0.90 | — |
| Natural cocoa powder | 11 | 0.105 | 0.37 |
| Lactose | 0 | 3.91 | — |

TABLE 3

Properties of Cebes ® 21-10 Oil

| Solid Fat Index | | Fatty Acid Composition (wt. %) | |
|---|---|---|---|
| 50° F. | 69–73 | Caprylic acid | 2.1 |
| 70° F. | 63–67 | Capric acid | 3.1 |
| 80° F. | 49–53 | Lauric acid | 55.4 |
| 92° F. | 1.0 max | Myristic acid | 21.0 |
| 100° F. | 0 | Palmitic acid | 8.5 |
| | | Stearic acid | 2.0 |
| Wiley melt point | 87–91° F. | Oleic acid | 6.9 |
| Iodine Value | 7–8 | Linoleic | 1.0 |

The oil blend was formed in a jacketed kettle with hot water flowing through the jacket. The oil blend was then combined with the remaining ingredients in Table 2 with the exception of the remaining 73% of the total fractionated palm kernel oil and the lecithin, which were not added at this point. This step should be performed in a heated vessel capable of maintaining the temperature of the mixture above the melting point of the oil blend. The contents of the vessel were mixed until a paste was formed. The paste was processed through a three-roll refiner to compress any particles in the paste to approximately 38 microns in size. During this compressing step, the paste becomes a flake because the surface area that the oil adheres to increased as the average particle size decreased. The resulting flake material was put back into the heated vessel and the remaining palm kernel oil and lecithin were added to produce a food blend component batter with the desired fat content and viscosity. The food blend component batter was formed to the desired shape (e.g., drops of about 1,000 count/lb) and cooled in a cooling tunnel. The resulting food blend component had a melting point of 104° F.

(b) Preparation of a Toasted Food Component.

A toasted food component for consumption by itself or in food products was formed using the following procedure. The food blend component formed in Example 1a was placed on single silicon-paper-lined baking sheets. The baking sheets were put into an oven that was preheated to 380° F. for 5 minutes. During the baking process, the food blend component experienced varying degrees of browning. The baking sheets were removed from the oven and the food component was allowed to cool. Significantly, the composition of the toasted food component (in terms of the amounts of components such as sugars, fats, protein and the like) was very similar to the composition of the food blend component as shown in Table 4.

TABLE 4

Composition of the Food Blend Component of Example 1a and the Toasted Food Component of Example 1b

| Analysis | Food Blend Component | Toasted Food Component |
|---|---|---|
| Protein % (Dumas) | 4.37 | 4.28 |
| Moisture % (Karl Fisher) | 1.44 | 1.04 |
| Fat % (GC) | 27.5 | 28.10 |
| Saturated | 23.1 | 23.6 |
| Monounsaturated | 2.07 | 2.1 |
| Cis-Cis Polyunsaturated | 0.45 | 0.46 |
| Trans | 0.34 | 0.34 |
| Total Sugar % (HPLC) | 64.2 | 63.9 |
| Glucose | 2.57 | 3.22 |
| Sucrose | 51.5 | 50.4 |
| Lactose | 10.1 | 10.3 |

EXAMPLE 2

(a) Baked Cookies Including Food Blend Component.

Cookies including the food blend component can be formed according to the following method. Table 5 shows ingredients which can be used to make cookies. The flour, soda and salt are sifted together and set aside. The Crisco®, brown sugar, granulated sugar, and hot tap water are creamed together until smooth. The egg and vanilla extract are then added to the creamed Crisco®/sugar mixture and the resulting mixture is beaten for two minutes. The sifted ingredient mixture is then added gradually and the resulting dough is beaten on low speed for one minute. Drops of food blend component made according to the process of Example 1a are folded into the mixture to form a cookie dough. Tablespoon size drops of the cookie dough are placed onto an ungreased Teflon™ cookie sheet and the cookie dough is baked for about 11 minutes at 380° F. to form the final cookie products (2a).

TABLE 5

Composition of a Cookie Including a Food Blend Component

| Ingredients | Amount of Ingredients |
|---|---|
| Flour | 239.7 g |
| Soda | 5.10 g |
| Salt | 7.20 g |
| Brown Sugar | 146.70 g |
| Granulated Sugar | 206.25 g |
| Crisco ® | 182.55 g |
| Egg | 116.55 g |
| Vanilla Extract | 2.26 g |
| Hot tap water | 58.80 g |
| Food blend component chips (1000 ct/lb) | 164 g |

(b) Baked Cookie Including Toasted Food Component.

Cookies including the toasted food component can be made according to the method described in Example 2a by substituting drops of the toasted food component produced using the method of Example 1b for the food blend component chips. The resulting cookies (2b) have the composition as shown in Table 5 with the exception that the toasted food component chips have been substituted for the food blend component chips.

EXAMPLE 3

Figure 1:
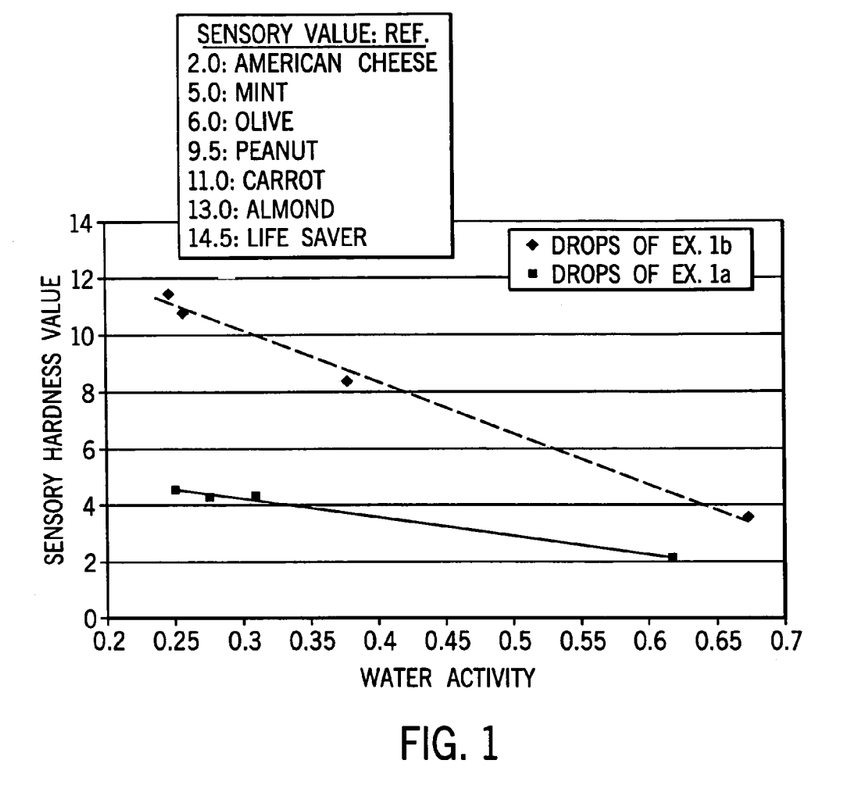
FIG. 1 shows a graph of the sensory hardness value as a function of water activity for a food blend component prepared according to Example 1a and a toasted food component prepared according to Example 1b.
Figure 3:
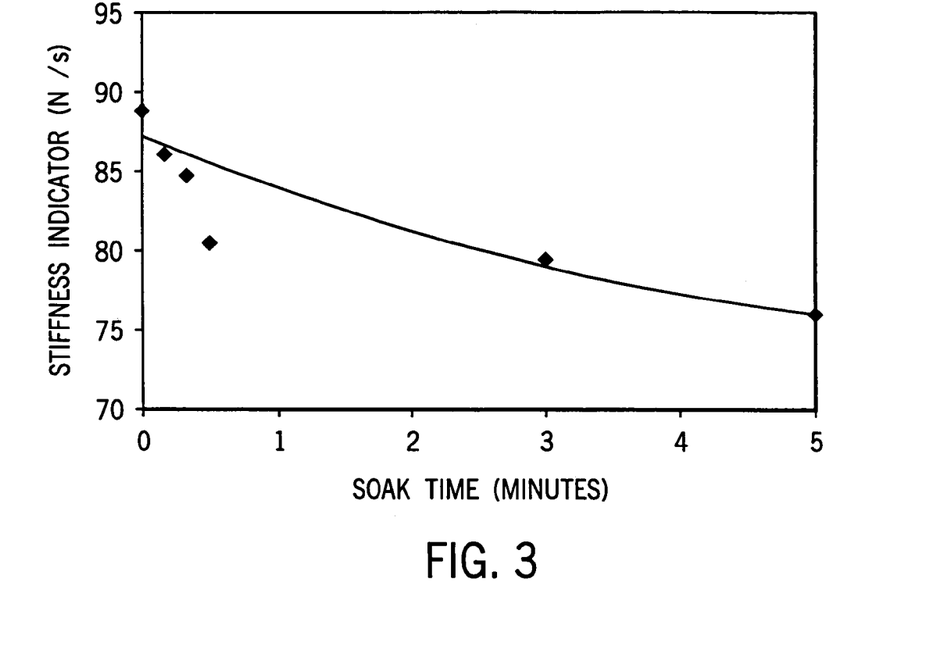
FIG. 3 shows a graph of the stiffness (N/s) as a function of soak time for a toasted food component prepared according to Example 1b and soaked in water.

The sensory hardness value as a function of water activity was determined for drops of the food blend component prepared according to Example 1a and the toasted food component prepared according to Example 1b. The results are shown in FIG. 1. Generally, the sensory hardness value of food blend and toasted food components increased as the water activity decreased. As shown in FIG. 3, linear regression analysis of the data for each food component was performed resulting in the linear relationships shown. As depicted by the differing slopes of the lines, the rate at which the toasted food component's sensory value increased was greater than the corresponding rate at which the food blend component's sensory hardness value increased for a given decrease in water activity. In general, the toasted food component's sensory hardness value varied from a high of about 10 to 12 at a water activity of about 0.225 to 0.3 to a low of about 3.5 to 4.0 at a water activity of about 0.65 to 0.7. Also, the food blend component's sensory hardness value varied from a high of about 4 to 5 at a water activity of about 0.25 to 0.3 to a low of about 2 at a water activity of about 0.625.

EXAMPLE 4

Figure 2:
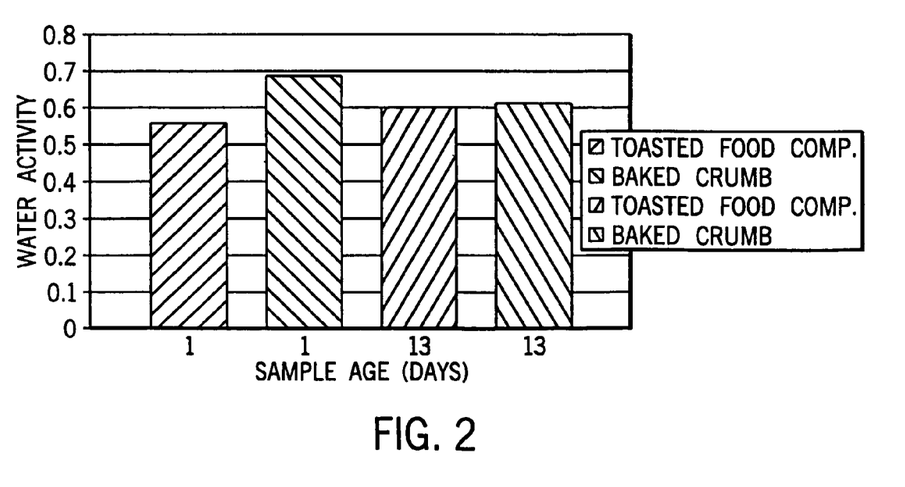
FIG. 2 shows a graph of the water activity of a toasted food component prepared according to Example 1b and a cookie crumb prepared according to Example 2b after one and thirteen days.

The water activity of the cookie crumb and toasted food component in the cookie prepared according to Example 2b were compared at one and thirteen days as shown in FIG. 2. The water activity of the cookie crumb and toasted food component were significantly different after one day. However, after thirteen days the water activity of the cookie crumb and toasted food component reached an equilibrium level. Specifically, the water activity of the toasted food component after one day was about 0.53 to 0.58, and the water activity of the cookie crumb was about 0.69. After thirteen days, the water activity of the toasted food component and the cookie crumb reached an equilibrium value of about 0.57 to 0.63.

EXAMPLE 5

The texture analyzer was used to determine the stiffness and toughness of the following samples: (1) food blend component prepared according to Example 1a, (2) the toasted food component prepared according to Example 1b, (3) the food blend component after being in the baked cookie prepared according to Example 2a for one day, and (4) the toasted food component after being in the baked cookie prepared according to Example 2b for thirteen days. The results are shown in Table 6. For each sample, the stiffness and toughness values represent the average stiffness and toughness values of measurements of ten individual food components. Significantly, the toasted food component that was in the cookie for thirteen days had a higher stiffness and toughness than the food blend component that was in the cookie for only one day.

TABLE 6

Mechanical Characteristics of Various Food Component Samples

| Sample | Stiffness (N/s) | Toughness (N * s) |
|---|---|---|
| Food blend component prepared according to Example 1a | 23.9 | 127 |
| Toasted food component prepared according to Example 1b | 90.1 | 321.2 |
| Food blend component from baked cookie prepared according to Example 2a Age: 1 day | 16.3 | 54.5 |
| Toasted food component from baked cookie prepared according to Example 2b Age: 13 days | 38.5 | 75.4 |

EXAMPLE 6

The bowl life of chips of the toasted food components prepared according to Example 1b was examined by measuring the stiffness of the chips as a function of soak time. Groups of ten individual toasted food components were placed in cold water (at 69° F.) for varying amounts of time. The average stiffness for each group of ten toasted food components was then determined and graphed as a function of soak time as shown in FIG. 3. The stiffness of a toasted food component was about 90 N/s prior to soaking. When the toasted food component started soaking, the stiffness decreased until, after five minutes, the stiffness was reduced to about 75 to 80 N/s, i.e., greater than 80% of its initial value. As referred to herein the term "bowl life" refers to chips which retain greater than 80% of their original stiffness after being soaked in water according to the procedure described above.

EXAMPLE 7

Figure 4:
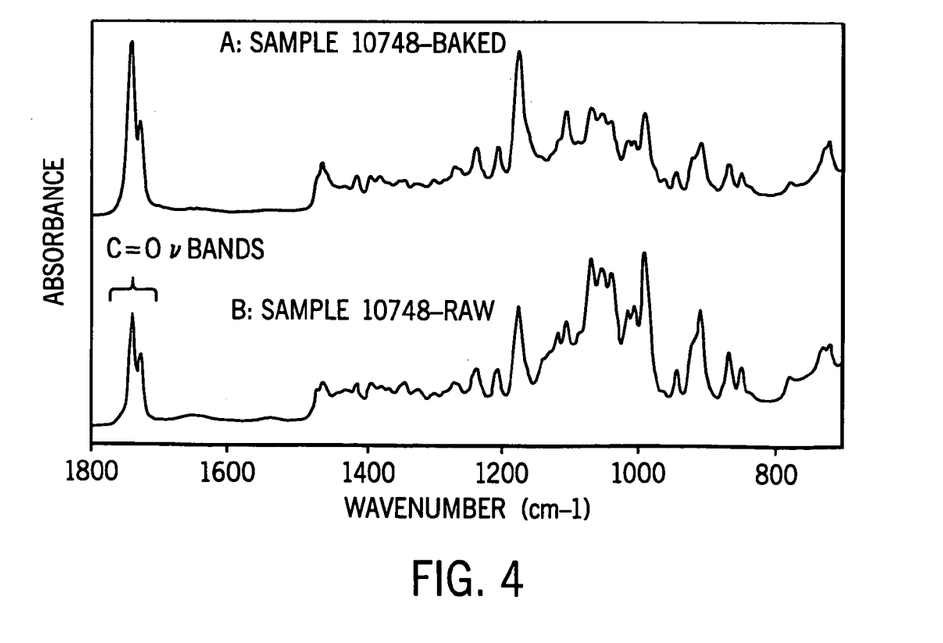

Fourier transform infrared spectroscopy (FTIR) was performed on samples of both the food blend component prepared according to Example 1a and the toasted food component prepared according to Example 1b. Fourier transform Raman spectroscopy (FT-Raman) was performed on samples of both the food blend and toasted food components prepared according to Examples 1a and 1b, respectively, except that the fat was removed via extraction with an organic solvent. The fat was extracted overnight using an organic solvent bath. For a pure compound, FTIR and FT-Raman provide a "spectral signature" that changes significantly when its chemical structure is altered. This feature can often be exploited in the case of simple mixtures (two or three constituents). FTIR and FT-Raman may also be useful for monitoring changes in physical states, e.g. changes in conformational order and/or crystallinity, when a sample has undergone a temperature change The FTIR results are shown in FIG. 4 where (A) is the toasted food component (Ex. 1b) and (B) is the food blend component (Ex. 1a). Examination and comparison of spectrum (A) and (B) reveals no significant chemical difference between the toasted food component and the food blend component. The fat/sugar ratios vary from sample spot to sample spot, and no relevance is necessarily implied. The C=O stretching frequencies are observed at ~1740.2 and 1730.0 $cm^{-1}$ for both spectrum (A) and (B). The common frequencies indicate that the hydrogen-bonding network of the fat has not been altered during the hardening process.

Figure 5:
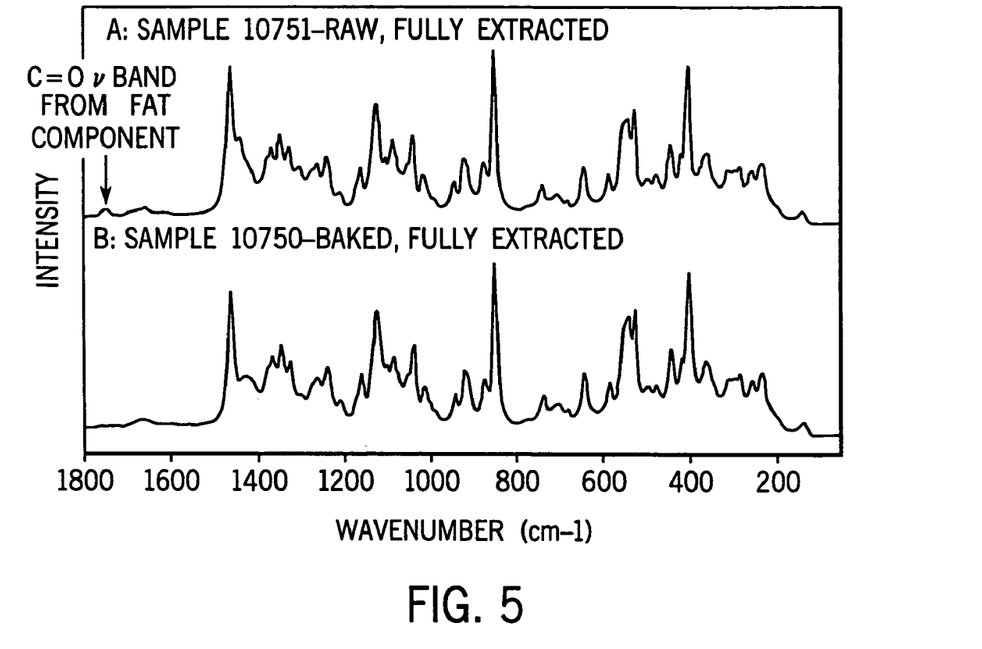
FIG. 5 shows a graph of the Fourier transform Raman spectroscopy of (A) a toasted food component prepared according to Example 1b and (B) a food blend component prepared according to Example 1a where the fat in both food components has been highly extracted.

The FT-Raman results of the extracted samples are show in FIG. 5 where (A) is the extracted food blend component and (B) is the extracted toasted food component. Comparison of spectrum (A) and (B) reveals no chemical difference between the toasted food component and the food blend component.

EXAMPLE 8

Figure 6:
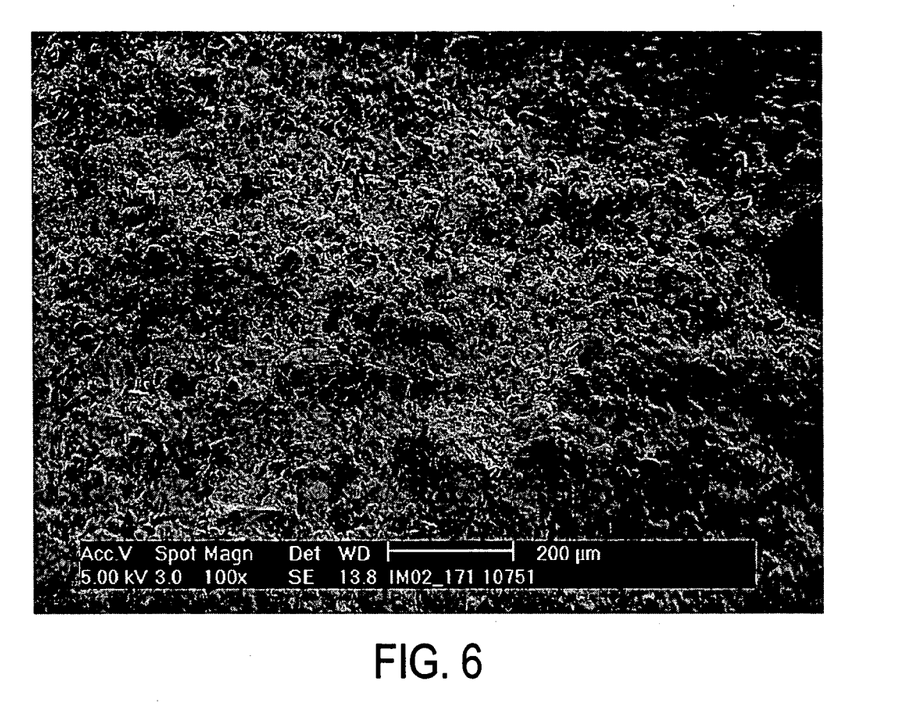
FIG. 6 shows a scanning electron microscope micrograph at 100× magnification of the outer surface of a food blend component prepared according to Example 1a where the fat has been highly extracted.
Figure 8:
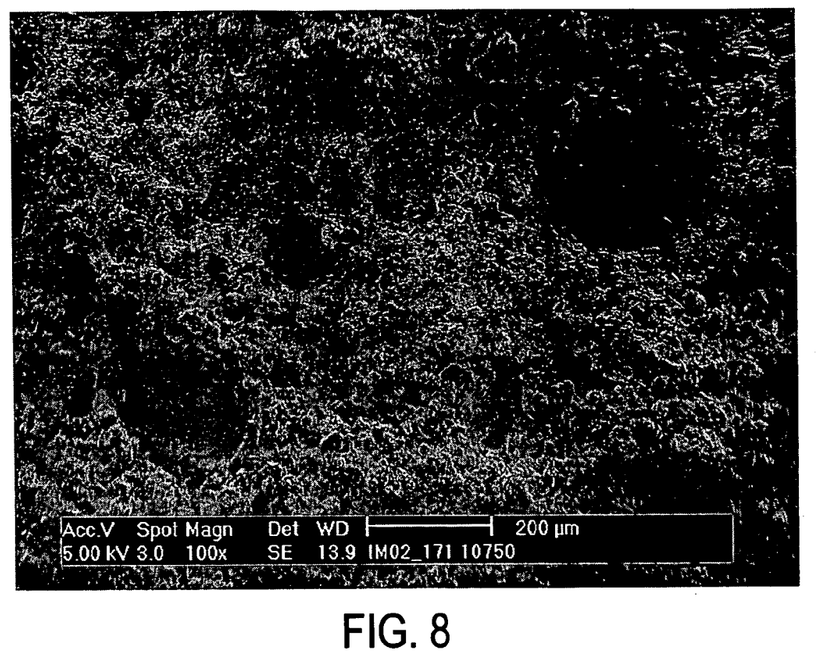
FIG. 8 shows a scanning electron microscope micrograph at 800× magnification of the outer surface of a toasted food component prepared according to Example 1b where the fat has been highly extracted.

A scanning electron microscope (SEM) was used to determine whether there were any detectable differences in morphology or crystallinity between the food blend component prepared according to Example 1a and the toasted food component prepared according to Example 1b. FIG. 6 is an SEM micrograph at 100× magnification of the outer surface of the food blend component where the fat has been highly extracted according to the method described in Example 7. FIG. 8 is an SEM micrograph at 100× magnification of the outer surface of the toasted food component where the fat has been highly extracted according to the method described in Example 7 also. Significantly, FIG. 8 shows that the outer surface of the toasted food component is highly pitted with a number of both large and small, inter-crystalline voids. The intensity of voiding evident in FIG. 8 is not evident in FIG. 6.

Figure 7:
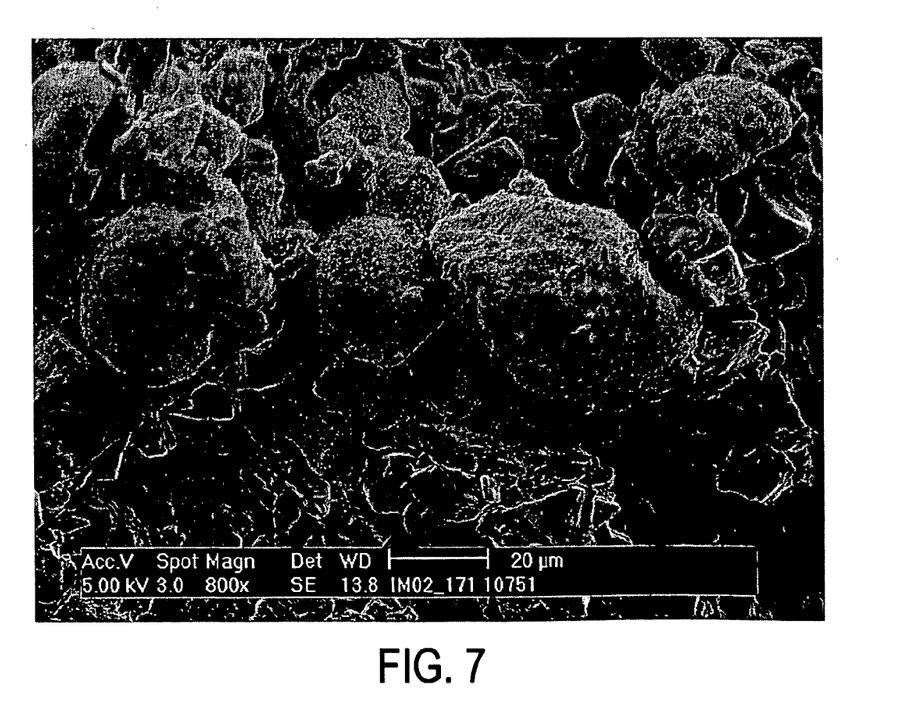
FIG. 7 shows a scanning electron microscope micrograph at 800× magnification of the outer surface of a food blend component prepared according to Example 1a where the fat has been highly extracted.
Figure 9:
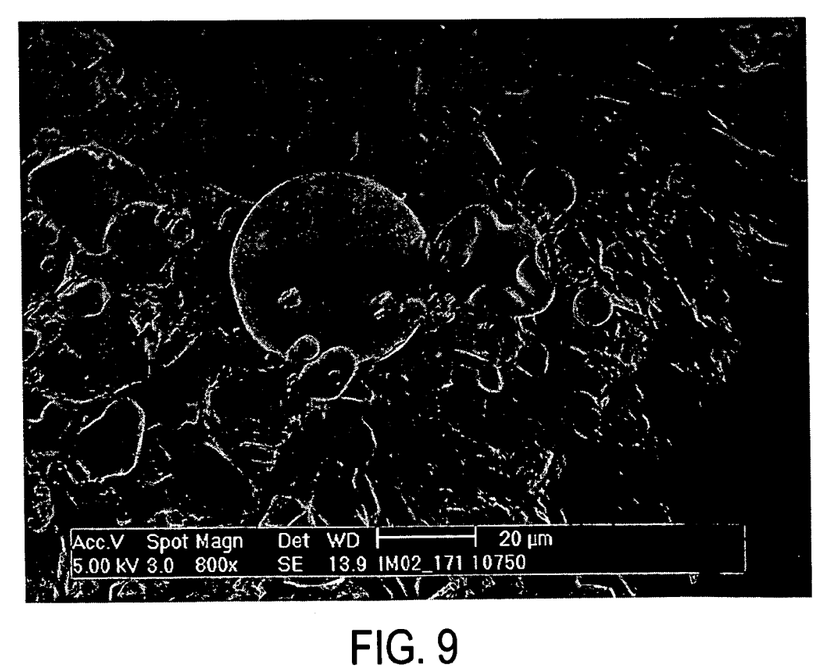
FIG. 9 shows a scanning electron microscope micrograph at 100× magnification of the outer surface of a toasted food component prepared according to Example 1b where the fat has been highly extracted.

FIGS. 7 and 9 are SEM micrographs at 800× magnification of the outer surface of the food blend and toasted food components, respectively, where the fat has been highly extracted according to the method described in Example 7. In FIG. 7, the higher magnification clearly shows the individuality of many of the sugar crystals, albeit with a thin coating of fat. In FIG. 9, the network-like nature of the sugar component is observable. In FIG. 9 it is more difficult to distinguish individual sugar crystals as opposed to FIG. 7 because the sugar crystals in FIG. 9 are, in effect, welded to each other. Although more difficult to distinguish, continuous bridges of interconnected sugar crystals are evident in FIG. 9. In other words, the sugar crystals shown in FIG. 9 have united with neighboring crystals to form a continuous crystalline network. The result is a virtual single crystal of sugar throughout the outer layer of the toasted food component.

While not wishing to be bound by theory, it is thought that this melding event is due to what appears to be partial melting of the sugar. Specifically, it is though that because the sugar only partially melts, sufficient crystalline structure remains to be recrystallization of the sugar that has melted. Thus, although all sugar within the toasted food component is united into an intact network, the original, independent sugar crystals remain evident in the toasted food component. Other ingredients besides sugar were also identified in FIG. 9 by their spherical-like morphology.

EXAMPLE 9

A series of tests were performed to determine suitable oven temperatures and bake times for making toasted food component according to Example 1b and using two stacked, silicon-paper-lined baking sheets, which promoted uniformity. Table 7 shows suitable oven temperatures and bake times for making the toasted food component. It was found that suitable temperatures range from about 340° F. to about 400° F., and suitable bake times range from about 13 minutes to 8 minutes, respectively.

TABLE 7

Suitable Oven Conditions for Making the Toasted Food Component According to Example 1b

| Oven Temperature (° F.) | Bake Time (Minutes) |
| --- | --- |
| 340 | 13 |
| 350 | 12 |
| 360 | 10 |
| 380 | 9 |
| 400 | 8 |

EXAMPLE 10

The monolayer value was determined at 25° C., 50° C., and 70° C. for the following food component samples: (1) the food blend component prepared according to Example 1a, (2) an outer layer of the toasted food component prepared according to Example 1b, and (3) an inner layer of the toasted food component prepared according to Example 1b. Table 8 shows the resulting monolayer values expressed as a weight percent. In general, the monolayer value of the outer surface of the toasted food component is more temperature stable than either the inner layer of the toasted food component or the food blend component. Also, the monolayer values of the toasted food component were generally higher than that of the food blend component. For further information on the monolayer value and moisture sorption generally, see Bell, L. N., and Labuza, T. P. 2000. Moisture Sorption. Pages 1–67. AACC: St. Paul, the disclosure of which is herein incorporated by reference.

TABLE 8

Monolayer Values

| Temperature (° C.) | Outer Layer of Toasted Food Component | Inner Portion of Toasted Food Component | Food Blend Component |
| --- | --- | --- | --- |
| 25 | 1.79 | 0.52 | 0.88 |
| 50 | 1.70 | 2.14 | 0.41 |
| 70 | 1.99 | 4.59 | 0.45 |

EXAMPLE 11

The effective diffusion coefficients ($D_{eff}$) at 25° C., 50° C., and 70° C. were determined at water activities of 0.2 and 0.4 for the following food component samples: (1) the food blend component prepared according to Example 1a, (2) an outer layer of the toasted food component prepared according to Example 1b, and (3) an inner layer of the toasted food component prepared according to Example 1b. Table 9 shows the effective diffusion coefficients obtained. In general, the outer layer of the toasted food component has a smaller effective diffusion coefficient than either the inner layer of the toasted food component or the food blend component.

TABLE 9

| | Effective Diffusion Coefficients ($D_{eff}$) | | | |
| --- | --- | --- | --- | --- |
| | 50° C. | | 70° C. | |
| | 0.2 $a_w$ | 0.4 $a_w$ | 0.2 $a_w$ | 0.4 $a_w$ |
| Outer Layer of Toasted Food Component | $2.3 \times 10^{-8}$ | $6.2 \times 10^{-8}$ | $3.8 \times 10^{-8}$ | $8.1 \times 10^{-8}$ |
| Inner Portion of Toasted Food Component | $1.3 \times 10^{-7}$ | $1.5 \times 10^{-7}$ | $1.32 \times 10^{-7}$ | $1.53 \times 10^{-7}$ |
| Food Blend Component | $1.25 \times 10^{-7}$ | $1.25 \times 10^{-7}$ | $1.37 \times 10^{-7}$ | $1.36 \times 10^{-7}$ |

EXAMPLE 12

The monolayer value was determined at 25° C., 50° C., and 70° C. for the following food component samples: (1) the food blend component prepared according to Example 1a, (2) an outer layer of the toasted food component prepared according to Example 1b, and (3) an inner layer of the toasted food component prepared according to Example 1b. Table 8 shows the resulting monolayer values expressed as a weight percent. In general, the monolayer value of the outer surface of the toasted food component is more temperature stable than either the inner layer of the toasted food component or the food blend component. Also, the monolayer values of the toasted food component were generally higher than that of the food blend component. For further information on the monolayer value and moisture sorption generally, see Bell, L. N., and Labuza, T. P. 2000. Moisture Sorption. Pages 1–67. AACC: St. Paul, the disclosure of which is herein incorporated by reference.

Figure 10:
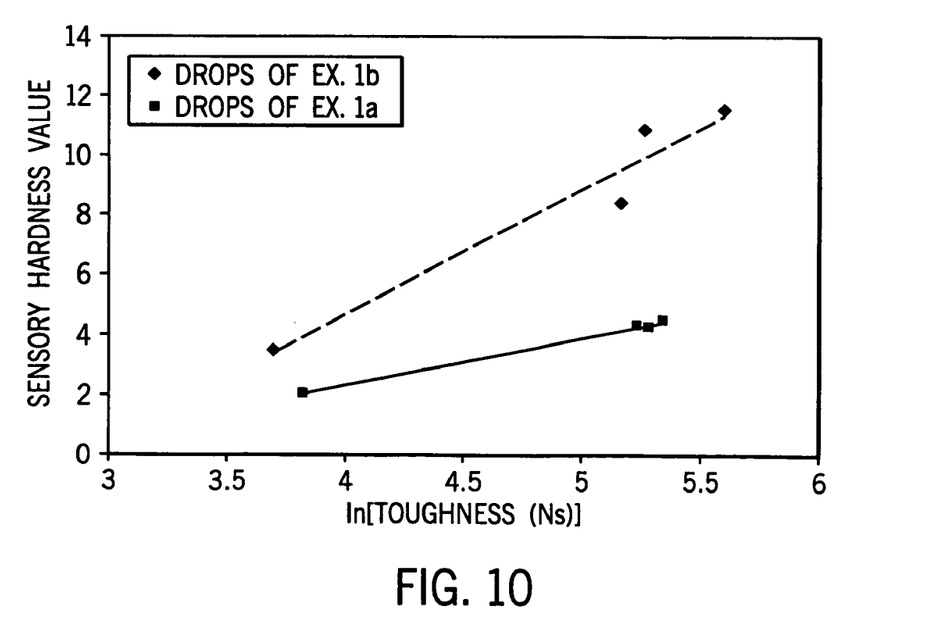
FIG. 10 shows a graph of the sensory hardness value as a function of the natural log of toughness (N*s) for a food blend component prepared according to Example 1a and a toasted food component prepared according to Example 1b.

A graph was made of the sensory hardness value as a function of the natural log of toughness (N*s) for the food blend component prepared according to Example 1a and the toasted food component prepared according to Example 1b. As shown in FIG. 10, the natural log of toughness increases as the sensory hardness value increases for both food components. The rate of increase (slope of the regression lines shown in FIG. 10) is greater for the toasted food component than for the food blend component.

Figure 11:
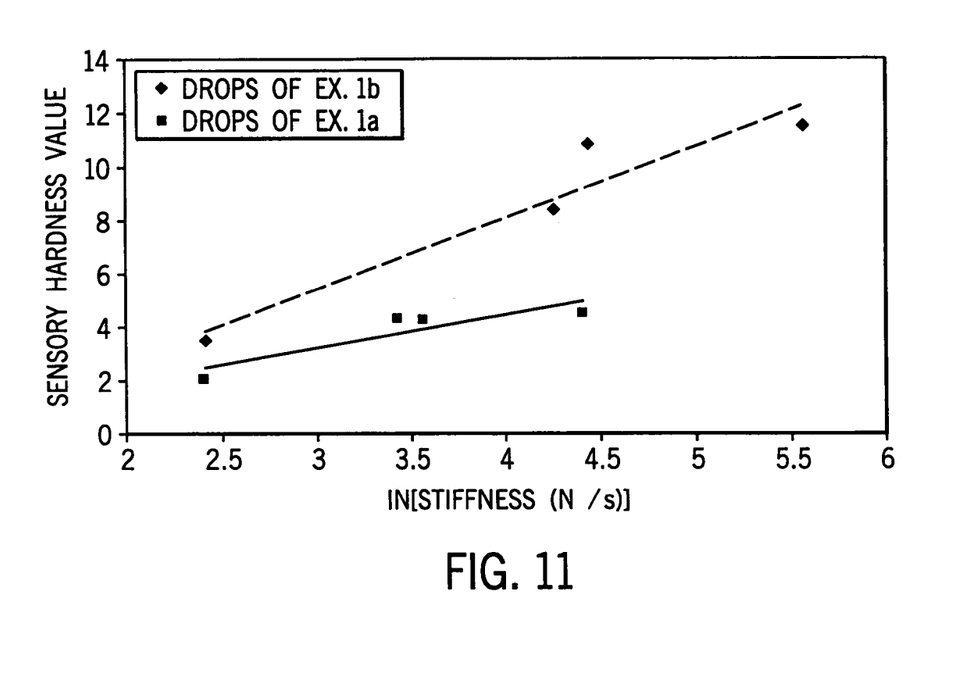
FIG. 11 shows a graph of the sensory hardness value as a function of the natural log of stiffness (N/s) for a food blend component prepared according to Example 1a and a toasted food component prepared according to Example 1b.

A graph was also made of the sensory hardness value as a function of the natural log of stiffness (N/s) for the food blend component prepared according to Example 1a and the toasted food component prepared according to Example 1b. As shown in FIG. 11, the natural log of stiffness increases as the sensory hardness value increases for both food components. The rate of increase (slope of the regression lines shown in FIG. 11) is greater for the toasted food component than for the food blend component.

Figure 12:
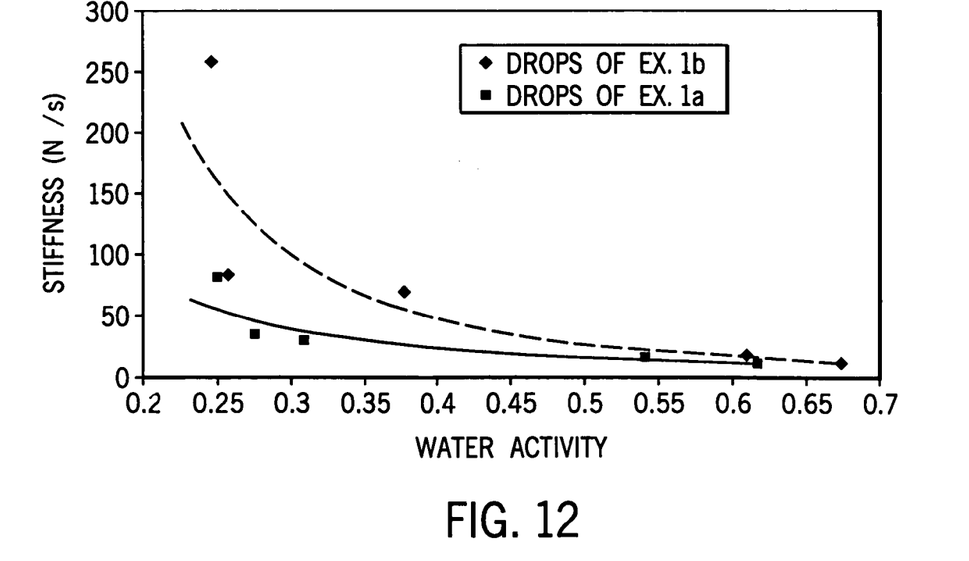
FIG. 12 shows a graph of stiffness (N/s) as a function of water activity for a food blend component prepared according to Example 1a and a toasted food component prepared according to Example 1b.

A graph (see FIG. 12) was also made of stiffness (N/s) as a function of water activity for the food blend component prepared according to Example 1a and the toasted food component prepared according to Example 1b. Generally, as shown by the exponential regression line, the stiffness of the toasted food component increased at a greater rate than the stiffness of the food blend component for a given decrease in water activity.

The invention has been described with reference to various specific and illustrative embodiments and techniques. However, it should be understood that many variations and modifications may be made while remaining within the spirit and scope of the invention.

What is claimed is:

1. A food component in particulate form comprising:
   at least about 50 wt. % of a bulking agent; and
   about 24 to 33 wt. % of a triacyiglycerol component having a melting point of about 100 to 120° F.;
   wherein the food component has a water activity of no more than about 0.4; and the particulates have a sensory hardness value of at least about 6 and comprise an inner layer having a monolayer value at 25° C. of no more than about 1.0 wt. %.

2. The food component of claim 1 wherein the bulking agent includes a saccharide component.

3. The food component of claim 2 wherein the saccharide component includes dextrose.

4. The food component of claim 1 wherein the bulking agent includes about 1 to 10 wt. % dextrose based on a total weight of the food component.

5. The food component of claim 1 wherein said food component includes an outer layer having a monolayer value at 25° C. of at least about 1.3 wt. %.

6. The food component of claim 1 further comprising nut flavoring.

7. The food component of claim 1 further comprising about 5 to 15 wt. % non-fat milk solids.

8. The food component of claim 1 wherein the triacyiglycerol component has a melting point of about 100 to 110° F.

9. The food component of claim 1 wherein the triacyiglycerol component has an Iodine Value of no more than about 10.

10. The food component of claim 1 wherein the triacyiglycerol component includes a lauric fat and a saturated 16/18 triacylglycerol.

11. The food component of claim 10 wherein the triacylglycerol component has a fatty acid composition including at least about 30 wt. % lauric acid and about 10 to 20 wt. % palmitic acid, stearic acid or a mixture thereof.

12. The food component of claim 1 wherein the food component is in a particulate form which includes an outer layer having a water activity of no more than about 0.4 and an effective diffusion coefficient of no more than about $8 \times 10-8$ m²/min at 50° C.

13. The food component of claim 1 having a substantially uniform chemical composition throughout.

14. The food component of claim 1 wherein the hulking agent comprises sucrose and lactose.

15. The food component of claim 1 having a substantially uniform chemical composition throughout; wherein the bulking agent includes about 1 to 10 wt. % dextrose based on a total weight of the food component; and the triacyiglycerol component has a melting point of about 100 to 110° F., an Iodine Value of no more than about 10 and a fatty acid composition including at least about 30 wt. % lauric acid and about 10 to 20 wt. % palmitic acid, stearic acid or a mixture thereof.

16. The food component of claim 1 further comprising cocoa powder.

17. A food component in particulate form comprising:
   a bulking agent, which includes dextrose; and
   about 24 to 33 wt. % of a triacyiglycerol component having a melting point of about 100 to 120° F.;
   wherein the food component particulates include an outer crystalline network layer having a monolayer value at 25° C. of at least about 1.3 wt. % and an inner layer having a monolayer value at 25° C. of no more than about 1.0 wt. %.

18. The food component of claim 17 comprising at least about 50 wt. % of the bulking agent; and wherein the triacylglycerol component has a melting point of about 100 to 110° F.; and comprises a lauric triacylglycerol and a saturated 16/18 triacylglycerol.

19. The food component of claim 17 wherein the triacylglycerol component has a fatty acid composition which includes at least about 40 wt. % lauric acid; about 12 to 18 wt. % palmitic acid, stearic acid or a mixture thereof about 5 to 8 wt. % oleic acid; and at least about 15 wt. % myristic acid.

20. The food component of claim 17 comprising about 27 to 30 wt. % of the triacylglycerol component.

21. A food product comprising:
a food component in particulate form which includes a bulking agent, which includes dextrose, and about 24 to 33 wt. % of a triacyiglycerol component having a melting point of about 100 to 120° F.;
wherein the food component particulates include an outer crystalline network layer and an inner layer having a monolayer value at 25° C. of no more than about 1.0 wt. %; and the food component particulates have a water activity of no more than about 0.4 and a sensory hardness value of at least about 6; and the triacylglycerol component has a fatty acid composition including at least about 30 wt. % lauric acid and about 10 to 20 wt. % palmitic acid, stearic acid or a mixture thereof.

22. A food product comprising:
a food component in particulate form including a bulking agent and about 24 to 33 wt. % of a triacylglycerol component having a melting point of about 100 to 120° F.;
wherein the food component particulates have a substantially uniform chemical composition throughout and include an outer crystalline network layer having a monolayer value at 25° C. of at least about 1.3 wt. % and an inner layer having a monolayer value at 25° C. of no more than about 1.0 wt. %.

23. The food product of claim 22 wherein said food product is an RTE cereal, a snack bar, a food topping, an ice cream, a candy, a snack mix, or a baked product.

24. A food product comprising:
a plurality of food component particulates which include at least about 50 wt. % of a bulking agent, and about 24 to 33 wt. % of a triacylglycerol component having a melting point of about 100 to 120° F.;
wherein each of the plurality of the food component particulates include an inner layer having a monolayer value at 25° C. of no more than about 1.0 wt. % and an outer crystalline network layer and has a water activity of about 0.5 to 0.7 and a sensory hardness value of at least about 4.

25. The food product of claim 24 wherein said food product is a baked product.

26. The food product of claim 25 wherein the baked product is a muffin, a bread, a cake, a pie, a cookie, a bar dessert, a brownie, or a pretzel.

27. A method of making a food component comprising:
providing a food composition in particulate form which includes at least about 50 wt. % of a bulking agent, and about 24 to 33 wt. % of a triacyiglycerol component having a melting point of about 100 to 120° F.; and
heating the food composition particulates at about 325 to 410° F. for a sufficient time to form food component particulates comprising an inner layer having a monolayer value at 25° C. of no more than about 1.0 wt. % and a crystalline outer layer having a monolayer value at 25° C. of at least about 1.3 wt. %.

28. A food component having a substantially uniform chemical composition throughout and comprising:
at least about 50 wt. % of a bulking agent; and
about 24 to 33 wt. % of a triacylglycerol component having a melting point of about 100 to 120° F.;
wherein the food component includes an outer crystalline network layer having a monolayer value at 25° C. of about 1.5 to 2.5 wt. % and an inner layer having a monolayer value at 25° C. of no more than about 1.0 wt. %.

29. The food component of claim 28 wherein the bulking agent includes about 1 to 10 wt. % dextrose based on the total weight of the food component.

30. The food component of claim 28 wherein the food component has a water activity of no more than about 0.4 and a sensory hardness value of at least about 6; and the triacyiglycerol component has a fatty acid composition including at least about 30 wt. % lauric acid and about 10 to 20 wt. % palmitic acid, stearic acid or a mixture thereof.

31. A food component in particulate form having a substantially uniform chemical composition throughout and comprising:
at least about 50 wt. % of a bulking agent; and
about 24 to 33 wt. % of a triacylglycerol component having a melting point of about 100 to 120° F.;
wherein the food component has a sensory hardness value of at least about 6 and includes an outer layer having a monolayer value at 25° C. of about 1.5 to 2.5 wt. % and an inner layer having a monolayer value at 25° C. of no more than about 1.0 wt. %.

32. A method of making a food component comprising:
providing a food composition in particulate form which includes at least about 50 wt. % of a bulking agent and about 24 to 33 wt. % triacylglycerol component having a melting point of about 100 to 120° F.; and
heating the food composition particulates at about 325 to 410° F. for a sufficient time to form food component particulates having a hardness value of at least about 6 and comprising an inner layer having a monolayer value at 25° C. of no more than about 1.0 wt. %.

33. The method of claim 32 wherein the food composition particulates at about 325 to 410° F. for about 5 to 15 minutes to form the food component particulates.

34. The method of claim 27 wherein the food composition particulates at about 325 to 410° F. for about 5 to 15 minutes to form the food component particulates.

35. The food component of claim 17 wherein the particulates have a water activity of about 0.2 to 0.3 and a sensory hardness value of 9 to 12.

36. The food component of claim 1 wherein the particulates have a water activity of about 0.2 to 0.3 and a sensory hardness value of 9 to 12.

* * * * *